May 22, 1928.  
E. R. POWELL  
1,670,378  
HEAT RESISTING METAL STRUCTURE  
Filed Jan. 10, 1927
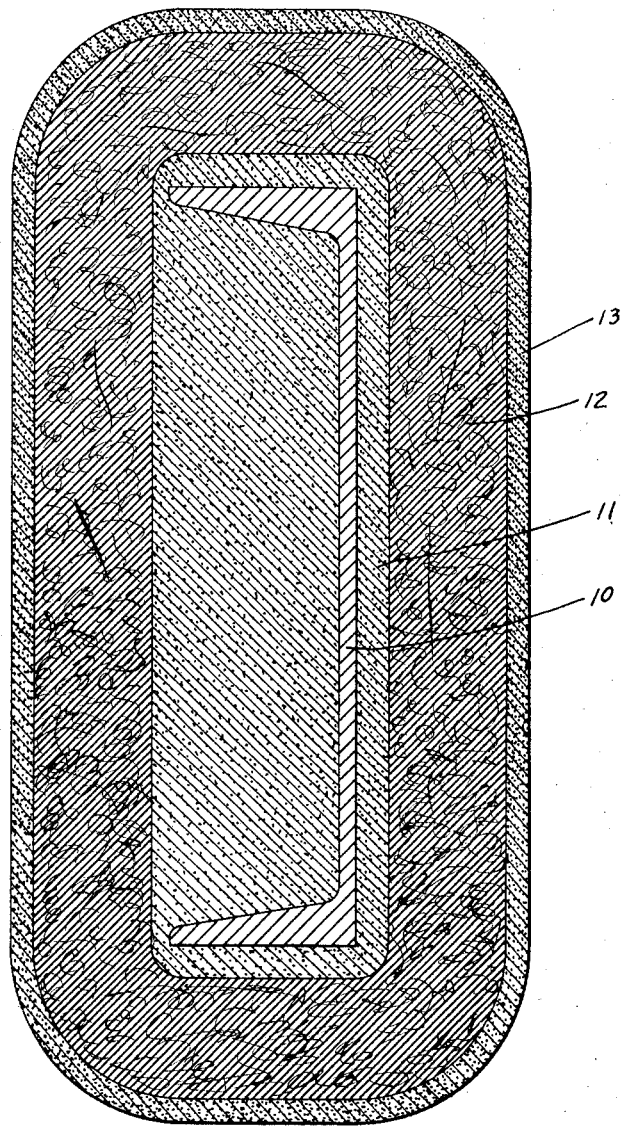
INVENTOR.  
EDWARD R. POWELL.  
BY  
ATTORNEYS.

Patented May 22, 1928.

1,670,378

UNITED STATES PATENT OFFICE.

EDWARD R. POWELL, OF ALEXANDRIA, INDIANA, ASSIGNOR TO BANNER ROCK PRODUCTS CO., OF ALEXANDRIA, INDIANA, A CORPORATION.

HEAT-RESISTING METAL STRUCTURE.

Application filed January 10, 1927. Serial No. 160,225.

This invention relates to heat protected structures.

The chief object of this invention is to protect supports such as columns, beams and similar members of steel, reinforced concrete and the like, whereby the same will not be subjected to direct heat, and furthermore will be maintained at a temperature relatively lower than that of its surroundings for a considerable length of time, at least sufficient to control the conflagration or put it out.

The chief feature of the invention consists in covering or substantially enclosing or covering the exposed portion of a support with a material that absorbs heat and changes form by reason thereof and thus prevents the passage or greatly delays the passage of heat to the support until such time as substantially all of the heat absorbing power of the enveloping material is exhausted.

Another feature of the invention consists in protecting the exposed surface of a support or the like with additional heat insulating material of suitable character such as rock wool or mineral wool, and furthermore, in covering the aforesaid insulating material with a refractory coating.

The full nature of the invention will be understood from the accompanying drawings and the following description and claims:

In the drawing the figure illustrates a transverse section of one form of the invention.

In the drawings 10 indicates a steel channel forming the support part of a heat resistant construction, the same having its exposed surfaces covered and herein enclosed by a layer of heat absorbing material 11, the same being preferably formed or applied in plastic condition and in such form that the exterior or exposed surface is uniform and is provided with no sharp corners, reentrant angles or other surface increasing conformation. A suitable heat absorbing material is one which does not necessarily have to be heat resistant, that is, refractory nor have heat insulating properties as the term is commonly understood, but it is one which must have the ability to absorb heat in the sense that it has a high specific heat capacity. Also the constituents may be selected and arranged that certain highly desirable endo-thermal chemical reactions will occur, whereby even though a relative large amount of heat is applied to it, but a small temperature change will accompany the same. A material of this character may, when subjected to intense heat, change its chemical form or change its physical form, or both, depending upon the materials used, preferable, also will appear more fully hereinafter, the reaction, physical, chemical or both, may be reversible, that is, it may take place at a temperature in one direction and return to its original form when subjected to normal temperature conditions, however, this last feature of reversibility is not absolutely necessary. Suitable materials may be employed in a composition of the aforesaid character and thus the same may contain calcium, magnesium, aluminum, iron, sulphur, carbon and silicon in an oxidized and hydrated condition and in various satisfactory proportions. A very cheap form of such a composition includes lime, Portland cement and a very small amount of hydrated or very hygroscopic salt such as

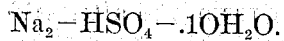

$$Na_2-HSO_4-.10H_2O.$$

Surrounding or covering the aforesaid heat absorbing coating is a layer of insulation which should be at least slightly porous for a purpose hereinafter to be described, and said insulation may consist of mineral or rock wool and include metallic inner and outer surfaces, netting or the like for confining the same. Covering the outer surface of the heat insulating material is a refractory coating which is also slightly porous for a purpose to be hereinafter described, and may be applied in plastic condition. Generally the insulation material will be applied in sheets suitably and preferably formed before application.

The aforesaid resultant construction is such that the refractory coating when subjected to high temperatures does not physically disintegrate. It also is heat resistant to a certain extent. Heat, after passing the coating, into the layer of insulation and through the same and the rate of heat transference is thus further retarded. Instead of immediately engaging the steel core or support member after passing through the insulation, the heat encounters the heat absorbing material.

When the heat has passed through the outer coatings or coating, or where none is employed, directly engages the heat absorbing material having high heat capacity as defined hereinbefore, the heat is first required to change the form of the material before it can raise the temperature of the same to any considerable degree. Thus, if the material includes considerable water of crystallation, although the same is not absolutely necessary as hereinbefore explained, the heat initially would free the material of its water of crystallation or such part of it as is readily detachable from the remainder of the material, and then the heat would thereafter vaporize this water and form steam which would escape through the pores of the insulation and refractory coating. If steam is not formed, a gas may be formed from the chemical reactions that might be obtained if certain materials were employed, and this also would escape through the pores so that there would be no cracking of the insulation and the refractory coating by reason of the expansion or tendency of the gas or vapor to escape. Of course, if the change in form takes place in the heat absorbing or high heat capacity material which would not liberate a gas or vapor, then it is relatively immaterial whether the insulation or refractory coating or coatings is porous. If certain materials are employed in the high heat capacity composition or heat absorbing material, then when subjected to intense heat for a considerable period of time the material changes form, as set forth, and after said heat is removed and the material cools, the same material resumes its original form by absorbing moisture or the several gaseous constituents from the atmosphere necessary to revert the material to its original form. A specific example of the utility of the invention is as follows:

It has been determined that with equal depths of coatings of insulation and refractory material applied to a steel core, that a temperature of 2500 degrees Fhrt. may require but one and one-quarter hours to raise the temperature of such a steel member from 70 degrees to an assumed dangerous temperature of 900 degrees. When the same amount of insulation and refractory coating is applied to the same steel member provided with a suitable amount of heat absorbing material, the same temperature in the steel may not be obtained until six hours have elapsed. Thus, the resultant triple construction has greater fire or heat resistance than a construction including but the double protection.

In certain instances when desirable, the heat absorbing material may have incorporated in it suitable reinforcement or protective material such as wire, rods, etc. Not only may this be employed, but also the same reinforcement may be employed in the insulation coating and it is not necessary that these coatings be applied in plastic form, but they may be built up and positioned adjacent the surface to be protected and suitably secured thereto.

The invention claimed is:

1. A heat resistant construction comprising a support having an exposed surface to be protected, a layer of relatively high heat absorbing capacity material adjacent thereto, a layer of heat insulating material adjacent said heat absorbing material, and a refractory coating for said layer of heat insulating material.

2. A heat resistant construction, comprising a support having an exposed surface, a layer of relatively high heat absorbing capacity material adjacent thereto, and a heat insulating and flame resistant coating therefor.

3. A heat resistant construction including a support having an exposed surface, a flame and heat resistant coating therefor, and an intermediate layer of relatively high heat absorbing capacity material therebetween.

4. A heat resistant construction of the character defined by claim 3, characterized by the coating being relatively porous and the heat absorbing material freeing a gaseous component when subjected to sufficient heat which escapes through the pores of said coating.

5. A heat resistant construction of the character defined by claim 3, characterized by the coating being relatively porous and the heat absorbing material freeing a gaseous component when subjected to sufficient heat which escapes through the pores of said coating, and the heat absorbing material being further characterized by its reversibility in that it resumes its original form by absorbing through the pores when subjected to normal temperature, a component of the character discharged therethrough when subjected to intense heat.

6. A heat resistant construction of the character defined by claim 3, characterized by the coating being relatively porous and the heat absorbing material freeing a gaseous component when subjected to sufficient heat which escapes through the pores of said coating, and the heat absorbing material being further characterized by its reversibility, in that it resumes its original form by absorbing through the pores when subjected to normal temperature a component of the character discharges therethrough when subjected to intense heat, said gaseous component being chiefly water vapor, and being derived from the atmosphere when the heat absorbing material returns to normal temperature.

7. A heat resistant construction of the character defined by claim 3, characterized by the heat absorbing material having a high heat capacity by reason of the change in form due to reactions between the components thereof.

8. A heat resistant construction comprising a support having an exposed surface to be protected, a layer of relatively high heat absorbing capacity material adjacent thereto, a layer of mineral wool adjacent said heat absorbing material, and a refractory coating for said layer of mineral wool.

In witness whereof, I have hereunto affixed my signature.

EDWARD R. POWELL.